US008119273B1

(12) United States Patent
Gerald, II et al.

(10) Patent No.: US 8,119,273 B1
(45) Date of Patent: Feb. 21, 2012

(54) UNIQUE BATTERY WITH AN ACTIVE MEMBRANE SEPARATOR HAVING UNIFORM PHYSICO-CHEMICALLY FUNCTIONALIZED ION CHANNELS AND A METHOD MAKING THE SAME

(75) Inventors: Rex E. Gerald, II, Brookfield, IL (US); Katarina J. Ruscic, Chicago, IL (US); Devin N. Sears, Spruce Grove (CA); Luis J. Smith, Natick, MA (US); Robert J. Klingler, Glenview, IL (US); Jerome W. Rathke, Homer Glen, IL (US)

(73) Assignee: The United States of America as represented by the Department of Energy, Washington, DC (US)

( * ) Notice: Subject to any disclaimer, the term of this patent is extended or adjusted under 35 U.S.C. 154(b) by 1055 days.

(21) Appl. No.: 11/690,413

(22) Filed: Mar. 23, 2007

Related U.S. Application Data

(63) Continuation-in-part of application No. 11/031,960, filed on Jan. 7, 2005, now abandoned.

(60) Provisional application No. 60/535,122, filed on Jan. 7, 2004.

(51) Int. Cl.
*H01M 2/16* (2006.01)

(52) U.S. Cl. ........ 429/145; 429/129; 429/131; 429/144; 429/246; 429/247; 429/320; 29/623.5

(58) Field of Classification Search ........................ None
See application file for complete search history.

(56) References Cited

U.S. PATENT DOCUMENTS

| | | | | |
|---|---|---|---|---|
| 3,736,186 | A * | 5/1973 | Liang | 429/323 |
| 4,849,311 | A * | 7/1989 | Itoh et al. | 429/317 |
| 5,034,290 | A * | 7/1991 | Sands et al. | 429/120 |
| 5,256,503 | A * | 10/1993 | Cook et al. | 429/249 |
| 5,756,062 | A * | 5/1998 | Greinke et al. | 423/449.4 |
| 6,447,958 | B1 * | 9/2002 | Shinohara et al. | 429/248 |
| 6,586,133 | B1 * | 7/2003 | Teeters et al. | 429/152 |
| 6,589,692 | B2 * | 7/2003 | Takami | 429/199 |
| 2002/0031706 | A1 * | 3/2002 | Dasgupta et al. | 429/212 |

* cited by examiner

*Primary Examiner* — Ula C Ruddock
*Assistant Examiner* — Tony Chuo
(74) *Attorney, Agent, or Firm* — Mark C. Lang; Brian J. Lally; John T. Lucas

(57) ABSTRACT

The invention relates to a unique battery having an active, porous membrane and method of making the same. More specifically the invention relates to a sealed battery system having a porous, metal oxide membrane with uniform, physicochemically functionalized ion channels capable of adjustable ionic interaction. The physicochemically-active porous membrane purports dual functions: an electronic insulator (separator) and a unidirectional ion-transporter (electrolyte). The electrochemical cell membrane is activated for the transport of ions by contiguous ion coordination sites on the interior two-dimensional surfaces of the trans-membrane unidirectional pores. The membrane material is designed to have physicochemical interaction with ions. Control of the extent of the interactions between the ions and the interior pore walls of the membrane and other materials, chemicals, or structures contained within the pores provides adjustability of the ionic conductivity of the membrane.

22 Claims, 8 Drawing Sheets

Table of Electrolyte Systems

| (legend: AAO nanotube, Li⁺, THF solution, PEO) | THF solution | Dry Salt from THF Solution | Contact with polymer electrolyte film |
|---|---|---|---|
| Li Triflate | 3.0 V | 2.5 | 2.2 V |
| Li Dodecyl Sulfate | 1.3 V | 1.3 V | 1.9 V |
| Li Dodecyl Sulfate/ PEO | 2.9 V | 2.6 V | N/A |

FIG. 8

UNIQUE BATTERY WITH AN ACTIVE MEMBRANE SEPARATOR HAVING UNIFORM PHYSICO-CHEMICALLY FUNCTIONALIZED ION CHANNELS AND A METHOD MAKING THE SAME

RELATION TO PREVIOUS PATENT APPLICATIONS

The present patent application is a continuation-in-part of, and claims priority of, U.S. Non-Provisional patent application Ser. No. 11/031,960 filed on Jan. 7, 2005 now abandoned, which thereby claims priority to U.S. Provisional Patent Application No. 60/535,122 filed on Jan. 7, 2004, by instant inventors, both of which are hereby incorporated by reference in their entireties.

U.S. GOVERNMENT RIGHTS

The United States Government has rights in this invention pursuant to Contract No. W-31-109-ENG-38 between the U.S. Department of Energy and the University of Chicago, representing Argonne National Laboratory.

TECHNICAL FIELD

The invention relates to a unique battery having an active, porous membrane and method of making the same. More specifically the invention relates to a battery having a porous, metal oxide membrane with uniform, physicochemically functionalized ion channels capable of adjustable ionic interaction.

BACKGROUND OF THE INVENTION

Increased use of consumer electronics such as cellular telephones, laptop computers and other portable devices, and the development of new technologies like electric vehicles (EV) has increased the demand for compact, durable, high capacity batteries. This demand is currently being filled by a variety of battery technologies including traditional lithium ion batteries. However, the metal packaging of traditional batteries makes them heavy, thick, prone to leakage and difficult to manufacture. New generations of solid-state batteries are emerging that allow the fabrication of consumer batteries in a wide variety of shapes and sizes that are thinner, safer and more environmentally friendly. However, state of the art, solid-state batteries have several shortcomings including relatively low values of ion conductivity.

Lithium polymer electrolytes have received considerable interest for use in solid-state batteries. These electrolyte systems are complex materials composed of amorphous and crystalline phases. It has been known since 1983 that the ion motion in polymer electrolytes occurs predominantly in the amorphous phase. Accordingly, the conventional approach to improving ionic conductivity has been to investigate conditions that either decrease the degree of crystallinity or increase the segmental motion of the polymer matrix. However, despite significant improvements, modern lithium-ion batteries employing polymer electrolytes are limited by lithium ion conductivities of order $10^{-6}$ S cm$^{-1}$ at ambient temperatures. This level of conductivity is not sufficient for many consumer battery applications.

The $10^{-6}$ S cm$^{-1}$ conductivity ceiling was overcome by true solid-state batteries developed by Duracell in the 1970s which used pressed aluminum oxide (Al$_2$O$_3$) powder and Li salt (LiI) as the electrolyte material. See, U.S. Pat. No. 4,397,924 issued to Rea on Aug. 9, 1983 (Rea '924). The solid alumina electrolyte provided two orders of magnitude greater conductivity than polymer electrolytes. The lithium ions travel across the surfaces of alumina particles by hoping from oxide oxygen to oxide oxygen on the amorphous surface. (Kluger K, Lohrengel M, Berichte Der Bunsen-Gesellschaft-Physical Chemistry Chemical Physics, 95 (11): 1458-1461 NOV (1991)). However, this ion conduction only occurs when sufficient contact between adjacent alumina particles is both created and maintained. The Rea '924 patent overcame the first part of the contact problem by severely compressing the components at compressive strengths of order 100,000 psi. The result is a very dense solid-state electrolyte. However, overtime the ionic conductivity of the electrolyte decreased as the contact between particles degraded. This was especially true when the electrolyte was subjected to shock or other mechanical trauma. Because Rea relied on physical compression to create contact between alumina particles, very small changes in the contact between the alumina particles could have a profoundly negative effect on the ion conduction of the material. In fact, it appears that this technology was virtually abandoned because of this limitation.

Recently aluminum oxide (Al$_2$O$_3$) membranes were considered for use as battery materials by other researchers, however, the mechanism for lithium-ion conductivity of the membrane itself has neither been considered nor explored, nor has the modification and adjustment of the membrane. For example, U.S. Pat. No. 6,586,133 issued to Teeters et al., on Jul. 1, 2003 (Teeters '133) teaches a nano-battery or micro-battery produced by a process comprising: providing a membrane with a plurality of pores having diameters of 1 nm to 10 μm, filing said membrane with an electrolyte; and capping each filled pore with an electrode from about 1 nm to about 10 μm in diameter in communication with said electrolyte to form individual nano-batteries or micro-batteries. While Teeters '133 suggests the use of aluminum oxide membranes, it teaches the membranes solely as an innocuous, inactive, "jacket" for containing or housing nano or micro cells. The Teeters patent is directed solely to the creation of nano and micro batteries and never teaches or even suggests using an active membrane to enhance the ion conductivity of the electrolyte in a synergistic manner. For example, the preferred pore diameter range of Teeters' system (up to 10 microns) is much too large for meaningful ion conductivity enhancement by the metal oxide membrane itself. Furthermore, Teeters teaches the use of AAO membranes with low pore densities and porosities which are inadequate for producing effective active (highly conductive) membranes. Thus, the membrane pores of Teeters function as simple compartments for containing a stack of anode, electrolyte, and cathode materials to form a cell. Teeters also teaches that the anode and cathode material of the preferred embodiment are contained inside the pore of the AAO membrane. Teeters invention, can be fabricated equally well by employing a variety of materials having pores. The principle of Teeters is the miniturization of a battery cell using AAO as a micro-container, not as a material for enhancing the performance of the battery itself.

Mozalev, et al. teach a porous alumina membrane as the separator for macrobatteries. See, A. Mozalev, S. Magaino, H. Imai, Electrochimica Acta, 46, 2825 (2001). Their work suggested that alumina membranes mechanically suppress Li dendrite formation, thereby improving cycling efficiencies. However, they have not suggested or discussed the lithium-coordinating role that modified aluminum oxide membrane walls can play. The object of the Mozalev invention is to mitigate formation of dendrites by use of a hard material for a battery separator. Any hard, porous, material will serve the object of Mozalev's invention.

U.S. Pat. No. 6,705,152 issued to Routkevitch et al., discloses a type nano-structured ceramic platform for gas sensors. Routkevitch's sensors comprise micro-machined anodic aluminum oxide films having high density nano-scale pores, sensing materials deposited inside the self-organized network of nano-pores and at least one electrode deposited on the AAO. The gas permeable electrodes are deposited upon the AAO so to provide electronic conductivity without closing the pores to outside gases, so to enable gas sensing. The object of Routkevitch's invention is to make nano or micro-sensing devices for detecting various substances at trace levels. Routkevitch teaches sensor devices that are open systems. Thus, the sensing materials deposited inside the network of nano-pores and the electrodes are continuously exposed to gas and liquid molecules from the ambient environment. A sensor device with blocked, clogged, or covered nano-pores is a closed system, and is not capable of performing the functions of sensing.

A major breakthrough in the room-temperature conductivity of lithium polymer electrolytes would significantly impact the rechargeable consumer battery market, as well as the emerging electric vehicle (EV) arena. Despite more than 20 years of active industrial and academic investigation, the current level of conductivity for lithium polymer electrolytes is not sufficient for many battery applications and suggests that a radical new approach based on a better understanding of ion transport is required.

SUMMARY OF INVENTION

The present invention relates to a unique battery employing a novel membrane system capable of adjustable ion conductivity. The novel characteristics of the invented battery and membrane stem from a better understanding of the ion-conductivity of certain membranes like anodized aluminum oxide (AAO) that have well-defined channels structures, and the membrane's synergistic relationship with various ion-coordinating substances.

While prior art references teach the use of certain specialized materials like AAO as part of an electrolyte (Rea '924) and as a nano or micro-container for the creation of nano and macro batteries (Teeters '133), the prior art fails to teach or even suggest the use of well defined, physically and chemically active AAO porous membrane (wherein the pores are coated with at least one ionic species) capable of ion-coordination and ion conduction, which act as both a separator and an electrolyte. Unlike the innocuous membrane disclosed in Teeters '133, the present membrane is designed to transportions without the addition of an electrolyte to the pore. Thus, a key component in Teeter's invention, the electrolyte, is replaced by an activated membrane channel in the present invention.

The Applicant's invented battery employs an active membrane that acts as both a separator and electrolyte within the same monolithic structure. The chemical composition, physical arrangement of atoms, and physical geometry of the pores play a role in the sequestration and conduction of ions. In one preferred embodiment, ions are transported via the ion-hoping mechanism where the oxygens of the $Al_2O_3$ wall are available for positive ion coordination (i.e. $Li^+$). This active membrane can be adjusted to a desired level of ion conductivity by manipulating the chemical composition and structure of the pore wall to either speed up or slow down ion conduction. Physical aspects of the active membrane (i.e. pore size, porosity and tortuosity) can also be varied to control conductivity. This adjustability allows one to create customized membranes and batteries specifically tailored for a particular application. It may be preferable that the membrane be unidirectional for certain applications. The active membrane of Appplicants' invention is more fully described in U.S. Provisional Patent Application No. 60/535,122 filed on Jan. 7, 2004, and U.S. Non-Provisional patent application Ser. No. 11/031,960 filed on Jan. 7, 2005, by instant inventors, both of which are hereby incorporated by reference in their entireties.

One embodiment of the invention generally comprises: a first electrode, a second electrode and an active, porous, ion-conducting membrane positioned between the first and second electrode, wherein the pores of the membrane are coated with ionic species, and wherein the membrane acts as both a separator and electrolyte.

Another embodiment of the invention relates to a membrane in which the faces of the membrane are coated with an ion-conducting polymer creating a laminate-membrane that obviates problems associated with ion transport at the interface and polarization (i.e., the spatial depletion of ions in an electrolyte material such that a gradient in the ion concentration is formed, causing battery failure).

A salient aspect of at least one embodiment of the present invention is changing the physical characteristics of the membrane and its pores (i.e. pore diameter, porosity, tortuosity etc.) in order to tailor the functionality of the membrane.

Still another aspect of at least one embodiment of the present invention is manipulation of the chemical matrix of the pores to tailor the membrane for specific applications.

Another aspect of one embodiment of the invention relates to safety features of the membrane which shut down the battery when critical temperatures are reached.

Yet another aspect of one embodiment of the invention relates to a synergistic membrane in which the walls of the membrane pores are coated with ions and a polymer material like polyethylene oxide and wherein the nanochannels of the AAO membrane are preferably oriented normal to the electrodes, so as to provide the shortest path between them. Thus, the pore walls of this synergistic membrane can act as a superhighway for maximizing ion conduction, allowing ions to travel via the hoping mechanism of the AAO membrane, via segmental motion via the polymer, via both mechanisms, or by a superposition mechanism.

Alternatively, the tortuosity of the membrane can be altered to customize the membrane and battery for a particular performance.

Another general aspect of at least one embodiment of the present invention relates to an electrochemical cell having a porous membrane, the membrane having physicochemically functionalized ion channels capable of adjustable ionic interaction, wherein the pores of said membrane are modified by physical, chemical, or electrochemical means to impart atomic coordination sites for positive ions or negative ions.

An advantage of at least one embodiment of the membrane of the battery is the ability to tailor the ion-conductivity of the membrane for specific uses. For example, ion-conductivity could be maximized for applications requiring fast responses and/or large amount of energy per unit time (i.e. EV acceleration) while ion conductivity could be lowered for less strenuous applications where high ion conductivity is not needed and/or if available would pose a safety hazard.

BRIEF DESCRIPTION OF THE DRAWINGS

FIG. 8 compares various electrolyte systems using AAO membrane.

DETAILED DESCRIPTION OF THE EMBODIMENTS

Figure 1:
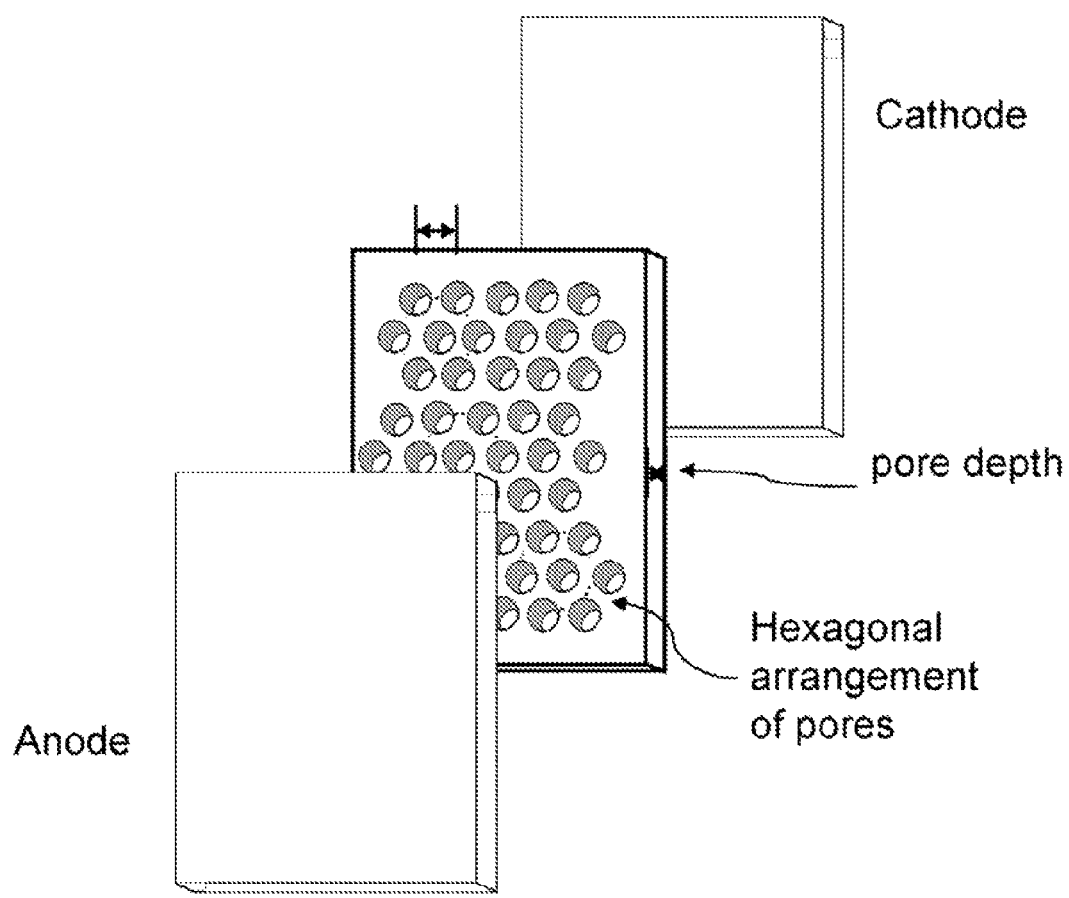
FIG. 1—is a schematic of the monolithic membrane of one embodiment of the present invention. The membrane comprising a flat thin film, a high density of ordered and cylindrical channels directed from a top to a bottom surface, and interior channel walls chemically activated for interaction with ions.
Figure 2:
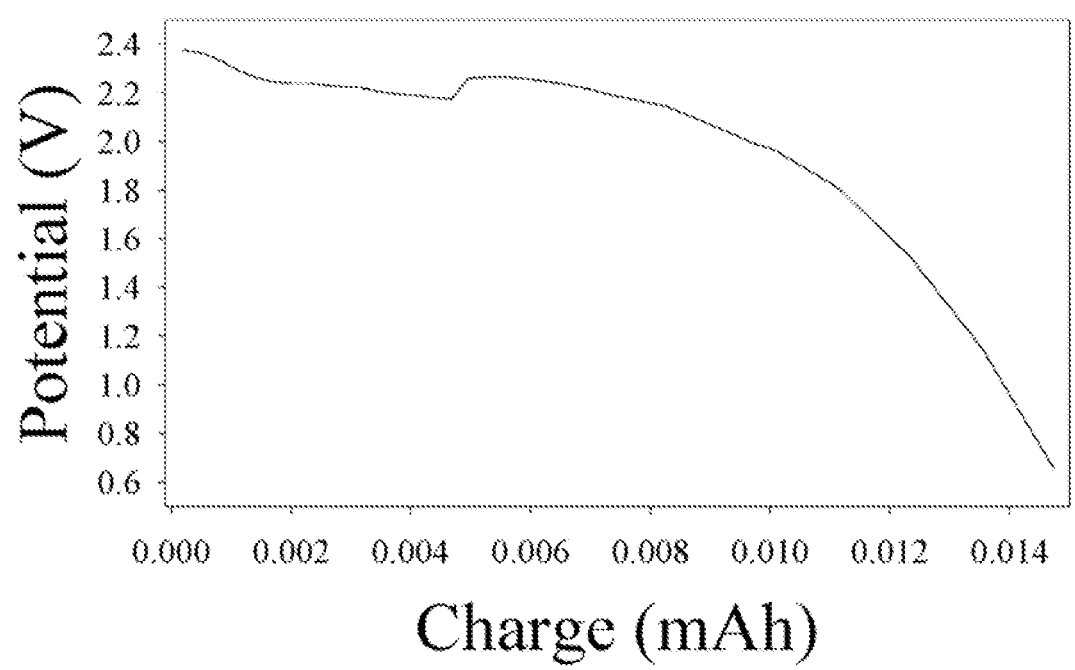
FIG. 2—is a graph of voltage plotted on the ordinate and time plotted on the abscissa representing the discharge curve of a cell comprised of an aluminum disk cathode, a porous monolith membrane of anodized aluminum oxide having the interior surfaces of the pores coated with a polymer electrolyte as a separator/electrolyte, and a lithium metal film anode.
Figure 3:
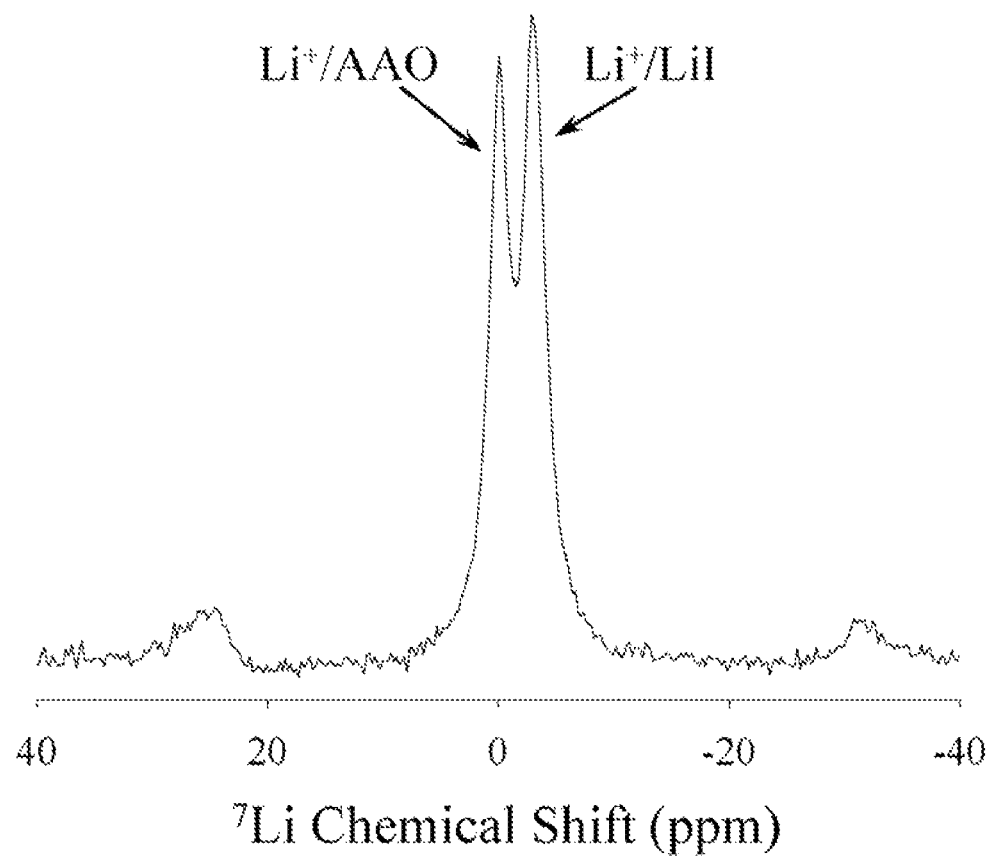
FIG. 3—relates to ionic lithium in (a) LiI/$Al_2O_3$ solid state systems, and depicts a $^7Li$ MAS NMR spectrum of a LiI-coated AAO membrane. The pore walls of the AAO membrane interact with LiI to produce highly mobile $Li^+$ ions. The LiI/AAO system shows that approximately 50% of lithium is ionic and highly mobile; the remainder of lithium is immobilized in LiI crystals. This spectrum shows that the walls have been coated with LiI and the walls have activated the lithium ions for conduction.
Figure 4:
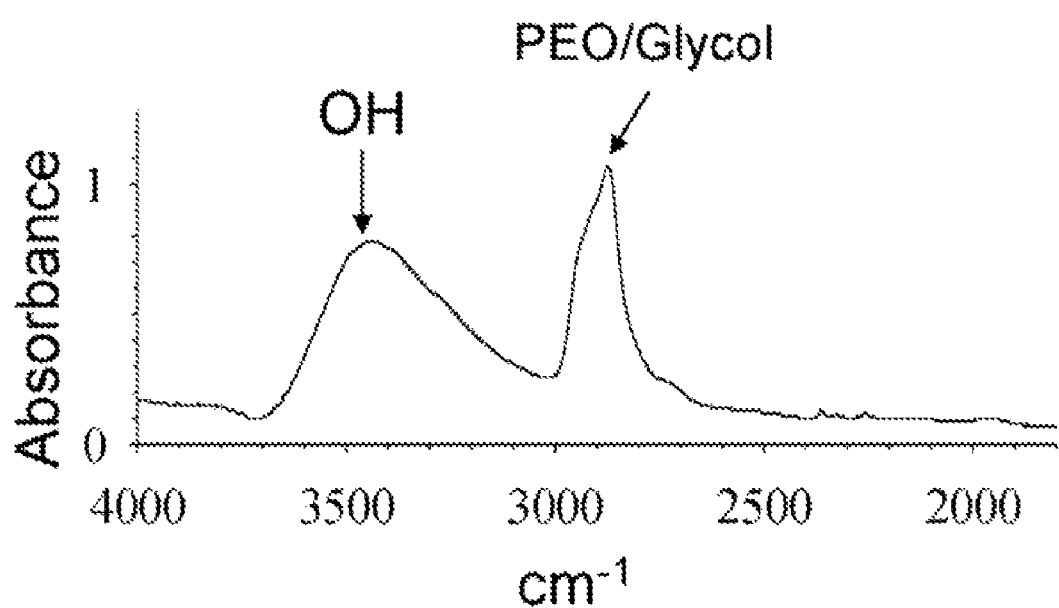
FIG. 4—is a FTIR spectrum of a poly(ethylene glycol)-coated membrane. The absorbance peak in the region 2800-2900 $cm^{-1}$ confirms a coating of poly(ethylene glycol) or other polyethers on the pore walls of the AAO membrane. The broad absorbance peak centered between 3400 and 3500 $cm^{-1}$ indicates that surface hydroxides and water molecules are also on the pore walls.

The instant invention relates a unique electrochemical cell generally comprising: a porous, active separator/electrolyte membrane (PAM) sandwiched between, a first electrode, and a second electrode; and method of making the same. More specifically the invention relates to a battery having a porous, metal oxide membrane with uniform, physicochemically functionalized ion channels capable of adjustable ionic interaction. In one embodiment the specialized membrane is made of a specialized material (i.e. AAO) having a plurality of pores running the thickness of the material, the pores having diameters ranging from about 2 nm to 150 nm, the pores being modified with an ion (salt) and/or an ion-conducting species or compound.

Unique Separator/Eletrolyte Membrane

A salient feature of the invented electrochemical cell is the interaction of the membrane channel walls with ions and compounds that have varying degrees of activity with ions. The separator/electrolyte membrane can be made of a variety of specialized materials having ion coordinating capability including but not limited to: metal oxides, plastics like SSZ-24 and ALPO-11 and various silicate glasses. A detailed description of the unique membrane can be found in U.S. Provisional Patent Application No. 60/535,122 filed on Jan. 7, 2004, and U.S. Non-Provisional patent application Ser. No. 11/031,960 filed on Jan. 7, 2005, by instant inventors, both of which are hereby incorporated by reference in their entireties.

Suitable metal oxides include but are not limited to amorphous titanium oxide, titanium dioxide, di-titanium trioxide, AAO (anodized aluminum oxide), amorphous aluminum oxide, di-aluminum trioxide, alumina, crystalline alpha aluminum oxide, crystalline beta aluminum oxide, crystalline gamma aluminum oxide, magnesium oxide, silicone oxide, vanadium oxide, zirconium oxide, germanium oxide, tin oxide, gallium oxide, indium oxide, iron oxide, chromium oxide, molybdenum oxide, nickel oxide, copper oxide, zinc oxide and combination thereof. Various metal alloy-oxides could also be used. Anodized aluminum oxide, "AAO", is a preferred metal oxide because of its adjustable physical pore structure and its good ion conducting ability.

The thickness of the membrane is a salient aspect of the invention and can be varied according to desired results. Thicker membranes greater than 30 microns (i.e. about 30-50 microns) have higher levels of resistance and are preferable when a robust membrane (and battery) is desired. Thinner membranes (about 10 nm-1000 nm) are better suited for applications that require low resistance. Membranes of medium thickness (about 1 micron-30 microns) can be used for applications in between.

Thin membranes are also useful in situations where the membrane is combined with a polymer, laminate or other substance that helps support the membrane (see, AAO-polymer hybrid and AAO-laminate discussed below).

The ability to control the dimensions of the pores in AAO makes it an ideal active membrane material. Controlling the physical and chemical properties of the membrane's pore walls allows the creation of customized membranes tailored for specific uses. It is well known in the art that when anodized under certain conditions, the AAO pores form a highly-ordered hexagonal arrangement of nano-channels perpendicular to the anode surface; and the pore diameter, pore length, pore spacing and pore-ordering are all adjustable by varying the current, temperature, time, and choice of acidic electrolyte in which the membrane is grown (See, H. Masuda, M. Satoh, Jpn. J. Appl. Phys 35, 126 (1996), see also, J. Li C. Papadopoulos, J. M. Xu, and M. Moskovits, App. Phys. Lett. 75, 367 (1999); Masuda and K. Fukuda, Science 268, 1466 (1995); U.S. Pat. No. 6,139,713 issued to Masuda et al., and U.S. Pat. No. 6,705,152 issued to Routkevitch et al., of which are incorporated by reference in their entireties. The physical and chemical characteristics of the pore walls are important variables in controlling ion-conduction.

Physical Modifications of the Membrane

An important aspect of one embodiment of the invented membrane is the surface area to volume (SA:V) of the membrane pores. The pores of one preferred embodiment of the invented membrane have a surface area to volume ratio in the range $2\times10^7$-$2\times10^9$ $m^{-1}$. A high SA:V ratio corresponds to high levels of ion coordination and transport by the fast ion-hoping mechanism of the membrane's walls. One achieves a high SA:V ratio by manipulating the diameter of the pores. Of course, one can manipulate the SA:V ratio to tailor the membrane for different applications.

Decreasing the diameter of the nano-channels of the membrane, increases the SA:V ratio and in turn increases the amount of ion coordination by aluminum oxide and transport via its ion-hoping pathway. This allows control over the ion-coordinating ability of the membrane by manipulation of the pore size. The limited pore sizes of the membrane can also enhance the ion-coordinating ability of polymers and other species present within the pores. Limited pore size constrains polymers, which causes them to straighten out and thus become more efficient at transporting ions (unconstrained polymers wrap around ions to maximize coordination, and hinder rapid ion transport).

Although pore size can be adjusted, it is critical to the present invention that the pore diameter of the membrane is between about 2 nm-150 nm, to take advantage of the ion-hoping mechanism, and the advantageous effects of confined ion-conducting polymers. It is preferable to use pore size in the range of about 5-100 nm, and more preferably to use pore sizes in the range of about 5-50 nm.

Such a limited pore size range is in contrast to the prior art, which teaches a wide range of pore diameters. Membranes with pore diameters greater than about 150 nm transport a majority of ion conduction via bulk electrolyte (if present) and not efficiently through the ion-hoping mechanism of AAO. Membranes with pore diameters less than 5 nm may be unpractical as they are difficult to manufacture, can be difficult to chemically modify, and can be difficult to fill.

The porosity of the membrane can also be used to tailor the ion conductivity. A suitable porosity range is between about 5-95%. The porosity depends on the intended use of the membrane: low porosity (about 5-20%) for low-power battery applications; high porosity (about 20-65%) for high-power battery applications; highest porosity (about 65-95%) for very high power battery applications. See, also U.S. Pat. No. 6,627,344 issued to Kang on Sep. 20, 2003; U.S. Pat. No. 6,589,692 issued to Takami on Jul. 8, 2003; and U.S. Pat. No. 5,290,414 issued to Marple on Mar. 1, 1994, all of which are hereby incorporated by reference in their entireties.

The tortousity of the membrane is the distance the ions travel in traversing the pore structure (ratioed against) divided by the geometric width of the membrane. A tortuosity of unity is generally considered the ideal value for high rates of ion conductivity as it represents a membrane having straight pores and thus the shortest distance between to opposite faces. However, membranes having tortuosity values greater than 1 may be used to create membranes with varying degrees of conductivity. It may be possible to manipulate the tortuosity by growing the AAO in a magnetic field and varying the angle of the magnetic field relative to the direction the AAO is grown.

Once the membrane has been made, its pores can be dilated by chemical etching, or contracted by processes such as atomic layer deposition and chemical vapor deposition. The first of the two pore-constricting processes can be used to fine tune the chemistry of the pore walls thereby changing the way in which the membrane coordinates ions (i.e. $Li^+$).

Chemical Modifications of the Membrane

The ion coordinating ability of the membrane can be altered by manipulating the chemical structure of the matrix of the pore wall surface. The pore walls can be chemically modified by coating the walls with an organic solution containing ions, anaqueous solution containing ions, an ion-conductive polymer, or combinations thereof, which engance or retard the coordination and transport of positive ions. In addition, the charge of the metal oxide can be changed by treatment of the walls with acids or bases. Alternatively ion conducting salts or species can be melted or otherwise attached, absorbed, or embedded in the pore wall surface. Any of the pore coatings described herein may have a thickness of less than about half the pore diameter of the base membrane.

AAO-Salt Membrane Coating

The invented separator-electrolyte can be created by the addition of a variety of compounds and/or species to the pore walls, however, unlike prior art membranes, the present membrane only requires the addition of one ion-conducting component like a salt (or ion) to become active.

Salt coatings can be added in a variety of ways including but not limited to: washing the pore walls with various salt containing solvents, melting salts directly onto the pore walls and combinations thereof. A variety of salts can be employed including numerous anhydrous salts.

When applying the salt using the solution the membranes are washed with a solution containing the salts and the solvent is evaporated by techniques well known in the art (i.e. heat) leaving a salt coating on the walls of the pores.

In one embodiment the pore walls are treated with an organic solutions containing at least one ionic species. Suitable organic solutions include, but are not limited to those, containing one or more of: methanol, formamide, propylene carbonate, ethylene carbonate, .gamma.-butyrolactone, 1,3-dioxolane, dimethoxyethane, dimethyl carbonate, methylethyl carbonate, diethyl carbonate, tetrahydrofuran, dimethyl sulfoxide and polyethylene glycol dimethyl ether; combined with at least one salt selected from the group (selected from): lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$), lithium bistrifluoromethanesulfonyl amide ($LiN(CF_3SO_2)_2$), and lithium triflate.

In another embodiment the membranes pores are treated with an aqueous solution containing a salt or other ionic species. Suitable salts include but are not limited to: $ZnCl$, $AlCl_3$, $AlCl_3.6H_2O$, $Al(NO_3)_3$, $HCl$, $NH_4OH$, $H_2SO_4$, $NaOH$, $KOH$, $LiOH$, $CsOH$, $NaCl$, $KCL$, $CsCl$, $Al_2(SO_4)_3$.

Alternately, the pore walls can be directly treated by melting the salt onto the surface of the pore wall. Preferred salts include but are not limited to: lithium iodide, lithium bromide, lithium chloride, lithium fluoride and combinations thereof.

Individual anions and cations (i.e. Li ions) can also be embedded into the surface matrix of the pore walls. Embedding ions into the matrix can be accomplished in a variety of ways including but not limited to the following: The AAO membrane is dried and evacuated to create open and clean pores. The evacuated AAO is exposed to metal alkoxides such as tetraethyl orthosilicate or aluminum isopropoxide or mixtures of metal alkoxides, which are in solution in dry organic solvents such as hexane. Reactions between the metal alkoxides and surface hydroxyl sites anchor the metal alkoxides to the channel walls. The AAO membrane is further treated by exposure to water vapor and or high temperatures to create a layered oxide surface. Bronsted acid sites, created via water and temperature treatments of the oxide layer, in a dried and evacuated AAO membrane can be further exposed to gaseous ammonia creating ammonium cation sites on the channel surface. Ammonium cations can be ion-exchanged for other cations such as lithium, sodium, rubidium, and cesium to create an ion-specific surface in the AAO membrane.

The chemical composition of the membrane itself can be modified to adjust the conductivity of the membrane. For example, mixed metal oxides can be employed to get desired conductivity results.

AAO-Alumina Membrane

Yet in another preferred embodiment the membrane pores are coated with nano-particles of alumina allowing ion-conduction via the ion-hoping mechanism by creating multiple parallel pathways for ion-conduction in the AAO channels. The membrane pores may also be coated with nano-particles of other metal oxides for similar purposes.

AAO-Polymer Hybrid Membrane

In another preferred embodiment, the pores of the membrane are coated with a layer of ion-conductive polymer, creating a synergistic AAO-polymer membrane. Suitable polymers include but are not limited to: polyether, polyethylene oxide, polypropylene oxide, polyacrylonitrile, polyvinylidene fluoride, polyvinylidene chloride, polymethyl methacrylate, polymethyl acrylate, polyvinyl alcohol, polymethacrylonitrile, polyvinyl acetate, polyvinylpyrrolidone, polyethyleneimine, polybutadiene, polystyrene, polyisoprene, vinylidene fluoride-hexafluoropropylene coploymer, poly(ethylene oxide), poly(propylene oxide), polyethylene glycols, polypropylene glycols, propylene carbonate, ethylene carbonate, dioctyl sebacate, diethyl phthalate, and derivatives of these polymers and combinations thereof.

The polymer material can be deposited in a variety of ways including but not limited to:

adding a liquid solution of polymer in THF (tetrahydrofuran), or other volatile solvent, to the channels of the membrane drop-wise, and THF allowed to evaporate and disperse the polymer.

Although the thickness of the polymer coating can be varied, the thickness is preferably less than or equal to about half the pore diameter. Given that the diameters of pores are generally between 2-150 nm, a suitable range of polymer thickness is generally between about 1-149 nm, preferably between about 1-75 nm, dependent upon the diameter of the pores. The walls of the AAO-polymer hybrid membrane should contain at least one ion conducting salt (or other ion conducting species). The salt can be coated on the walls of the AAO membrane prior to the addition of the polymer or the salt can be incorporated within the polymer before the polymer is applied to the walls of the pores.

The hybrid polymer-AAO membrane allows ion conduction via two different pathways: (1) the fast ion-hoping mechanism along the walls of the AAO pores and (2) a slower mechanism dependent on segmental motion through the polymer. It is believed that in certain embodiments, the two mechanism work together in synergistic fashion to allow rates of ion conduction that exceed (or underseed) either of the mechanism working alone. This synergistic membrane can be customized for wide range of applications.

For applications requiring very fast ion conductivity, cation conduction can be designed almost exclusively via a polymer-assisted fast hopping mechanism associated with alumina. This result is accomplished by limiting the use of the polymer to a thin film. The desirable film thickness is generally between about 1-20 nm thick, preferably 1-10 nm thick, most preferably between about 1-5 nm thick (along the surface of the AAO pore walls.) The pore walls of this synergistic membrane act as a superhighway for ion-conduction, allowing ions to travel via the hoping mechanism of the AAO membrane, via a modified segmental motion (due to polymer-AAO interactions) or possibly by a synergism of ion displacement mechanisms. Applications with lower ion conduction requirements could be designed by increasing the amount of polymer present within the pores and thus the percentage of ion coordination and transport via the bulk polymer segmental motion mechanism.

Laminated Membrane

In another preferred embodiment the top and bottom faces of the membrane are coated with an ion-conducting polymer. This laminated membrane allows fast ion conduction through the AAO portion of the membrane and allows enhanced contact between the membrane and electrodes when the membrane is used in a battery. A thin layer of soft polymer coating on the faces of the membrane creates a bridging effect between the hard and uneven interfacial surfaces of the electrodes and the porous membrane that is beneficial for ion transport across the boundary region. This very thin polymer layer improves the conductivity of the electrolyte/electrode interface, and obviates problems associated with polarization because ion diffusion over a thin polymer layer rapidly equalizes ion concentration gradients. Furthermore, the hybrid membrane overcomes many problems associated with previous very thin all-polymer membranes including breach of the polymer membrane separator which can cause unsafe conditions in all-polymer membranes but which would be protected by the metal oxide (or other) membrane in the present embodiment. Thickness of the polymer coating ranges from about 1 nm to about 10 µm. The preferred thickness is determined by the surface roughness of the electrode and AAO membrane. Smoother surfaces might only require a coating of about 1 µm or less. Rough surfaces require up to a about 10 µm thick (or even thicker) coatings. This represents an improvement over existing solid-state polymer electrolytes because in this application the polymer electrolyte film can be made much thinner. Thin films mitigate the polarization problem due to the sub-micron thickness of the films, a distance over which ion diffusion can rapidly equalize ion concentration gradients.

Conventional polymer electrolyte films are limited by the polarization effect. It is desirable to make these films as thin as possible, preferably less than about 10 µm, which were unsafe in the prior art due to short circuit safety concerns. However, thick films are required to prevent internal short circuit due to the roughness of the electrode surface. In our application, a very thin film can be employed with out short circuit hazards because of the AAO separator/electrolyte between the electrodes. The polymer can be a variety of polymers and can be deposited using a variety of techniques some of which have been discussed earlier in the polymer-hybrid embodiment. It should be noted that the laminate is added to an active membrane, the active membrane being described earlier (i.e. AAO-salt, AAO-polymer hybrid etc.).

Membrane w/Laminate Safety Fuse

Another embodiment incorporates a thermal safety fuse into the membrane. For example, a thin layer of porous, non-ion conducting material like polyethylene or polypropylene is deposited on the electrode/electrolyte interface. The holes of the porous non-conducting material must line up with the holes of the active membrane, or the holes of the non-conductor coat must be larger than the diameter of the pore in the active membrane so that ions can be conducted form cathode to anode in a cell. The top-coat is designed to melt at a temperature at which utilization of the battery becomes unsafe, thus covering the active membrane holes with a non-ionically conductive material, and disengaging the battery circuit by inhibiting conduction. It should be noted that the laminate is added to an active membrane, the active membrane being described earlier (i.e. AAO-salt, AAO-polymer hybrid etc.) Below please find examples of some of the various embodiments of activated AAO membranes of the present invention.

Membrane Example I

Anodized Aluminum Oxide Membrane

IA.—Aluminum strips of 98% purity (6.0 cm×1.5 cm×0.15 mm) were immersed in 0.3 molal oxalic acid maintained at 276 K and anodized at 40 VDC until transparent. Residual aluminum islands in the translucent anodized aluminum oxide (AAO) films were removed by oxidation using a solution of $CuCl_2$ in dilute HCl. The films were washed with deionized water, dried at 383 K for 15 minutes in air, and cooled under dry nitrogen. Removal of water coating the pore walls was accomplished by heating the membranes to 330 K under vacuum for two hours, or heating the membranes to 700 K under dry nitrogen.

IB.—Square pieces of aluminum foil, of 99.999% purity (2.0 cm×2.0 cm×0.10 mm) were, coated on one side with nail polished (to protect the covered side from anodization) and dried and then immersed in 0.3 molal oxalic acid maintained at 276 K and anodized at 40 VDC until transparent. Residual aluminum islands in the translucent anodized aluminum oxide (AAO) films were removed by oxidation using a solution of $CuCl_2$ in dilute HCl. The films were washed with deionized water, dried at 383 K for 15 minutes in air, and cooled under dry nitrogen. Removal of water coating the pore walls was accomplished by heating the membranes to 330 K under vacuum for two hours, or heating the membranes to 700 K under dry nitrogen.

IC.—The AAO templates with pore sizes of about 20, 50, and 100 nm were grown by potentiostatically anodizing aluminum plates (0.15 mm thick, 99.9+% purity) in an aqueous solution of 14% $H_2SO_4$, 4%, and 2% oxalic acid respectively, and at a voltage of approximately 20V, 50V, and 100V respectively. After the anodization, the remaining aluminum was etched by a 20% HCL-0.1 mol·$L^{-1}$ $CuCl_2$ aqueous mixed solution. Then, the barrier layer was dissolved using 20% $H_2SO_4$.

ID.—A device, called the single-sided anodizer was developed to anodize one side of a planar aluminum sample. This device was employed to synthesize AAO in circular and other shaped areas on aluminum sheets and disks. The aluminum sheet (of purity 99.999%) is actively cooled at the bottom face, and anodization is confined to the top face. Typically, an o-ring (diameter, 1.5 cm) is used to define a circular area that will be exposed to an aqueous 0.3 m oxalic acid solution. A cylindrical container is made to compresses the o-ring to form a seal between the aluminum surface, the o-ring, and the open base of the container. The container is filled with the acid solution (approximately 10 ml), which is cooled to 275 K by contact with the cold aluminum. An aluminum metal strip cathode electrode is positioned in the acid solution at the top of the container. A potential of 40V DC is applied between the cathode (−) and the aluminum sample to be anodized, anode (+). The current and temperature are monitored by computer as the anodization process proceeds over a period of 1 week. The AAO sample is then removed and washed using distilled water. A 2 M HCl solution of $CuCl_2$ is drop wise added to the backside of the aluminum-supported AAO membrane to remove the residual aluminum; a transparent AAO disk surrounded by aluminum metal results. The aluminum-supported AAO membrane is washed with distilled water and dried under nitrogen at 400 K for two hours.

Membrane Example II

AAO-Coated (Salt) Membrane

IIA.—The pores in an AAO membrane were coated with organic salts, such as lithium triflate and lithium dodecyl sulfonate, by the application of solutions of these salts in THF, followed by solvent evaporation at elevated temperatures in a nitrogen atmosphere. The membranes were heated by laying them flat on a heating mantel. The application of the salt solutions was done drop wise on the top surface of the membrane.

IIB.—The pores in an AAO membrane were coated with inorganic salts, such as lithium iodide and lithium bromide, by the direct application of these salts to the membrane surface and heating the membrane under nitrogen gas in a furnace to 400-500K or to the melting point of the salt.

One membrane was dried at 773 K in air and then coated with molten LiBr at the same temperature.

IIC—The Fabrication of a AAO+LiI Solid-State Electrolyte-Separator

A circular area of 1.3 cm diameter was selectively anodized on one side of a flat 2.5 cm×2.5 cm×0.0254 cm-thick piece of high purity (99.999%) aluminum metal using a single-sided anodizer system. The anodizer system consisted of an o-ring that was compressed onto the top side of the aluminum surface using a cylindrical container with two openings; one opening fit over and compressed the o-ring, the other opening was used to fill the container with electrolyte and to insert the positive electrode. The cylindrical container contained 20 ml of a 0.3 m oxalic acid heavy water solution. The bottom side of the aluminum metal was placed on top of a semiconductor thermoelectric module (Peltier) cooler, which maintained the electrolyte solution at 3-5° C. The negative electrode was connected to the aluminum metal. A potential of 40 volts was applied between the two electrodes for a period of 3 days. The aluminum metal with a circular top section of porous anodized aluminum oxide (AAO) was floated on a pool of 2 M HCl acid solution containing dissolved $CuCl_2$; the aluminum metal was completely removed by oxidation after 20 minutes. The free-standing disk of porous AAO was rinsed with water. The thickness of the disk was 8 μm, measured by optical microscopy. The AAO disk was then dried under a stream of nitrogen gas. A bubble test was designed to confirm the formation of pores and unobstructed pore openings. Thus, a drop of water was placed on the top surface of the AAO disk, and the formation of microscopic air bubbles was observed as the air in the pores was displaced by water. A slow rate of formation, and small numbers of bubbles indicated that the top pore openings were blocked. The partially obstructed pore openings were widened by floating the disk (top face down) on a pool of 6 wt. % $H_3PO_4$ acid solution warmed to 30° C. for 15 minute intervals until the bubble test revealed the rapid formation of large numbers of bubbles. The dense aluminum oxide barrier layer formed during the anodization process on the bottom side of the AAO disk was dissolved by floating the disk face down on a pool of 6 wt. % $H_3PO_4$ acid solution warmed to 30° C. for 30-60 minutes. The barrier layer was completely dissolved when the disk no longer floated. The bubble test produced no observable bubbles from either surface of the disk when the channels were opened at both ends. The final thickness of the AAO disk was 5 μm. The AAO disk was dried under a stream of nitrogen gas and then heated on a hot plate to 60° C. A solution of LiI in dimethylcarbonate was alternately deposited drop wise on the top and bottom faces of the AAO disk, and allowed to evaporate. The dry AAO disk impregnated with LiI salt constituted a solid-state electrolyte/separator for a lithium-ion battery.

Membrane Example III

AAO-Polymer Hybrid Membrane

The pores of an AAO membrane were coated with a layer of a polymer electrolyte to form an ion conducting separator/electrolyte monolith. The polymer electrolyte was composed of PEO and lithium triflate and had an oxygen to lithium ion ratio of 8:1, and which was made by a well-know procedure. The pore walls were coated by placing the membrane on the surface of a hot plate and heating to 400 K in a dry nitrogen gas atmosphere. The polymer electrolyte was smeared onto the surface of the membrane and allowed to permeate the pores for a period of 10 minutes. The AAO membrane was turned over and the procedure was repeated. Any excess polymer on(e) top or bottom faces of the membrane was removed from the surface. Complete and uniform coating of the pores with polymer electrolyte required several minutes to several hours of heating; longer periods of heating were required for thicker membranes. A piece of lithium foil (anode) was contacted to the top surface of the AAO membrane and a graphitic carbon electrode (cathode) was similarly contacted to the bottom surface. A potential was measured across the two electrodes. The potential indicated the transport of ions through the pores of the membrane.

Membrane Example IV

AAO-Laminate Membrane

An exemplary laminate membrane was fabricated by the following procedure. The pores of an AAO membrane were dried in an open-air furnace at 773 K and then coated with molten LiBr at the same temperature by placing anhydrous LiBr powder in contact with the membrane surface for 30 minutes.

The membrane was cooled and transferred to a nitrogen atmosphere and heated on a hot plate to 400 K. A PEO/Li-triflate polymer electrolyte was smeared onto the surface of the membrane and excess electrolyte was scraped off using a knife edge. The AAO membrane was turned over and the procedure was repeated. Both surfaces of the AAO membrane were slightly tacky and easily adhere to the surfaces of the electrodes. A piece of lithium foil (anode) was contacted to the top surface of the laminate AAO membrane and a graphitic carbon electrode (cathode) was similarly contacted to the bottom surface. A potential was measured across the two electrodes. The potential indicated the transport of ions through the thinly-laminated membrane surfaces and the pores of the membrane.

Voltage measurements for lithium-ion cells employing $Al_2O_3$ separator/electrolytes (using the specified salts) include: 2.5 V/lithium triflate; 1.3 V/lithium dodecyl sulfate; 0.5 V/LiBr. These results and preliminary electrochemical discharge curves indicate that lithium ions encounter an oxygen environment on the AAO walls that coordinates ions and allows ion movement.

Electrodes

A physiochemcially-active membrane separator (PAM) (or laminated PAM), as described above, is paired with suitable first and second electrodes and hermetically sealed to form a functional electrochemical cell or battery. Unlike sensors, which are unsealed and inherently open systems, the present invention calls for the use of electrodes that cover and isolate the pores from environmental agents such as gases and liquids, thereby forming a hermetically sealed system. Operation of a closed battery system of the present invention requires that macroscopic quantities of an electroactive species contained within one electrode be transported through the nano-pores of the PAM to the other electrode. Exposure of the electrodes or the nano-pores of the PAM to environmental agents such as oxygen and water would irreversibly impede battery operation. In battery applications, the AAO separator-electrolyte membrane is sealed with electrode materials on both faces. That is, the pore openings on both sides of the membrane are covered and sealed by an electrode material that can take up and release macroscopic quantities of electroactive ions transported through the membrane pores. In a preferred embodiment, the AAO separator-electrolyte membrane and conjoined electrodes are hermetically sealed. The hermetic seals create a closed battery system, impermeable to outside gases.

A salient distinction between sensors and batteries is the quantity of charge that is transported through the nanopores. The optimal sensor device conducts a nano-scale level (nano-amps) or smaller current in response to an environmental agent such as a gas or liquid. The optimal battery device of the present invention conducts a macro-scale level (milliamps) or larger current in the charge and discharge process of battery operation. Sensors deliver minute currents to provide a response to the detection of trace quantities of a gas or liquid. Batteries deliver large currents to provide energy to a device such as a motor or computer to perform work.

It is a requirement that the composition of molecular species on the interior walls of the nano-pores in a sensor device changes dramatically when the sensor device is exposed to a gas or liquid molecular species (analyte). The magnitude of the sense signal is proportional to the quantity of adsorbed molecular species on the interior walls of the nano-pores in a sensor device. The composition of the molecular species on the interior walls of the nano-pores in a battery device of the present invention is essentially constant for the charge and discharge process of the battery operation.

The first and second electrode materials are placed one on either side of the PAM. The electrodes can be made of a variety of materials known in the art, or the corresponding alkali or alkaline ion materials including but not limited to: $MoO_3$, $Cr_3O_8$, $V_2O_5$, $V_6O_{13}$, $LiV_3O_8$, $MnO_2$, $LiCoO_2$, $LiNiO_2$, $LiMn_2O_4$, $LiVO_2$, $LiCrO_2$, $WO_3$, $TiO_2$, $TiS_2$, $MoS_2$, $NiPS_3$, $TiSe_3$, $TiTe_2$, $MoS_2$, $MoSe_2$, $InSe(.)$ coke, graphite, aluminum, CFn, $(C_2F)n$, $C_7CoCl_2$, poly(acetylene), poly(pyrrole), poly(vinylferrocene), poly(aniline), poly(p-phenylene), poly(phenylene sulfide).

The electrode materials can be attached to the PAM using a variety of methods well known in the art including but not limited to various adhesives, mechanical attachments (i.e. coupling devices) or other materials or means. The electrodes may also be attached using methods known in the art including but not limited to melting the electrode materials onto the faces of the AAO membrane. Alternative the electrodes can be deposited upon the PAM using various techniques.

The electrode materials should be selected to correspond with the materials of the PAM so as to form a functional electrochemical cell system. The electrodes are preferably impermeable to gas.

In an alternate embodiment the faces of the AAO separator/electrolyte are covered with a laminate before attachment of the electrodes, in one such embodiment an ion-conducting polymer is applied to the faces covering the pores of first and second faces of the AAO separator/electrolyte.

Exemplary Micro/Nano-Battery Systems

Figure 5:
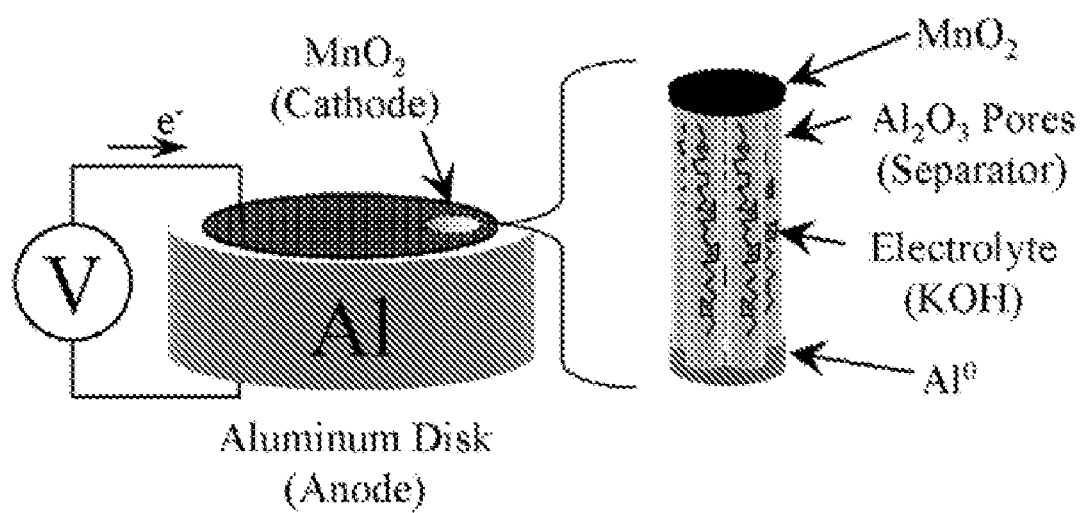
FIG. 5—illustrates one embodiment of the invented battery system having: a $MnO_2$ cathode, an aluminum anode and a separator/electrolyte membrane constructed of an activated AAO.

FIG. 5 illustrates one embodiment of the invented battery system having: a $MnO_2$ cathode, an aluminum cathode and a membrane constructed of AAO. The pores of the AAO membrane were coated with KOH salt to create a PAM as described in detail above. The AAO-KOH membrane acts as a separator and electrolyte, therefore an additional electrolyte is not required as taught by the prior art.

Figure 6:
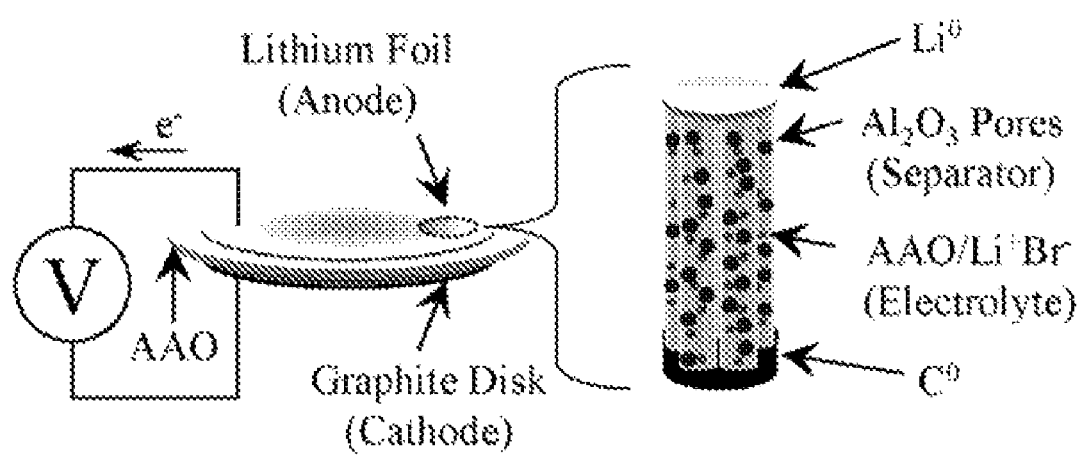
FIG. 6—illustrates another embodiment of the invented battery system comprising: a lithium (foil) anode, a graphite (disk) cathode, and a separator/electrolyte membrane constructed of an activated AAO.

FIG. 6 illustrates another embodiment of the invented battery system comprising: a lithium (foil) anode, a graphite (disk) cathode, and a membrane constructed of AAO. The pores of the AAO membrane were coated with a LiBr salt to create a PAM as described above. The AAO-LiBr membrane acts as a separator and electrolyte, therefore an additional electrolyte is not required as taught by the prior art.

Figure 7:
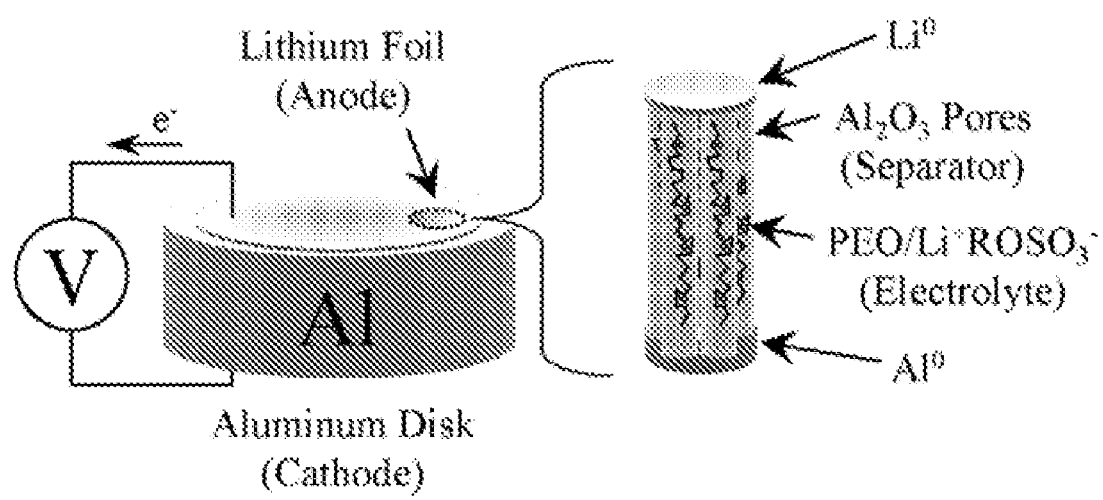
FIG. 7—illustrates yet another embodiment of the invented system comprising: a lithium (foil) anode, an aluminum (disk) cathode, and a separator/electrolyte membrane constructed of an activated AAO.

FIG. 7 illustrates yet another embodiment of the invented system comprising: a lithium (foil) anode, an aluminum (disk) cathode, and a membrane constructed of AAO. In this case the AAO pores are coated with a polymer (i.e. PEO) which includes a salt (i.e. Li$^+$ROSO3$^-$ such as lithium triflate). The AAO-polymer/salt membrane acts as a separator and electrolyte, therefore an additional electrolyte is not required as taught by the prior art FIG. 8 compares various electrolyte systems using AAO membranes. Polished aluminum disks were anodized to form an Al$_2$O$_3$ porous separator (as described above). THF solutions of lithium salts or lithium salts and a polymer (PEO) were deposited into the pores of the separator and were tested for ion conductivity while still wet (column 1). The liquid solution was then evaporated off leaving only the lithium salt (or salt/polymer) which was then tested for ion conductivity (column II). A polymer electrolyte was applied to the anode side of the membrane of certain embodiements and tested for ion conductivity (column III). The voltage measurements were made between a lithium foil anode positioned above the AAO separator and the aluminum cathode disk substrate.

The results clearly illustrated that the application of an ionic species, like a dry salt (i.e. lithium triflate) to the AAO pores create an active solid states separator/electrode capable of effectively hosting ions. This means that such activated AAO membranes can act as both the separator and electrolyte for a battery system. In fact, the invented solid state separator/electrolyte performed similarly to that of wet electrolyte systems.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations thereof, is not intended to limit the claimed processes to any order except as may be specified in the claims. All ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like refer to ranges which can be subsequently broken down into sub-ranges as discussed above. Accordingly, the invention is limited only by the following claims and equivalents thereto.

All publications and patent documents cited in this application are incorporated by reference in their entirety for all purposes to the same extent as if each individual publication or patent document were so individually denoted.

We claim the following:

1. A specialized battery produced by a process comprising:
providing a base membrane having a first and second face, the base membrane having a plurality of pores running the thickness of the base membrane between the first and second faces, and wherein the base membrane is constructed of (a) specialized materials selected from the group consisting of ion conducting materials consisting of: metal oxides, specialized plastics, silicate glasses, and combinations thereof and wherein the base membrane pores have an inner wall;
coating the inner pore walls of the base membrane with a defined pore coating, wherein the defined pore coating is selected from the group consisting of: salts, anions, cations, and combinations thereof, producing a first physicochemically active membrane (PAM) separator/electrolyte, and further wherein the defined pore coating has a thickness of less than about half the pore diameter of the base membrane;
attaching or depositing a first electrode to the first face of the PAM;
attaching or depositing a second electrode to the second face of the PAM, wherein the first electrode completely covers the first face of the membrane to form a first seal, wherein the second electrode completely covers the second face of the membrane to form a second seal, wherein the base membrane pores have diameters ranging from about 2 nm to about 150 nm and wherein the electrodes seal-off the pores from the ambient environment, and further wherein the pores are not otherwise filled.

2. The battery of claim 1, wherein the base membrane is constructed of a metal oxide selected from the group consisting of: aluminum oxide, silicone oxide, titanium oxide, magnesium oxide, vanadium oxide, zirconium oxide, germanium oxide, tin oxide, gallium oxide, indium oxide, iron oxide, chromium oxide, molybdenum oxide, nickel oxide, copper oxide, zinc oxide and combinations thereof.

3. The battery of claim 1, wherein the base membrane is made of anodized aluminum oxide (AAO).

4. The battery of claim 1, wherein the first and second electrodes and first and second seals are impermeable to gas and liquid, creating a closed battery system.

5. The battery of claim 1, wherein the first and second faces of the PAM are coated with a ion conducting polymer laminate coating prior to attachment of the electrodes, wherein the laminate coating has a thickness between about 1 nm and 10 µm, and further wherein the laminate coating does not enter the membrane pores.

6. The battery of claim 1, wherein at least a portion of the pores have a tortuosity of about 1.

7. The battery of claim 3, wherein the first and second electrodes are independently constructed of (a) materials selected from the group consisting of: MoO$_3$, Cr$_3$O$_8$, V$_2$O$_5$, V$_6$O$_{13}$, LiV$_3$O$_8$, MnO$_2$, LiCoO$_2$, LiNiO$_2$, LiMn$_2$O$_4$, LiVO$_2$, LiCrO$_2$, WO$_3$, TiO$_2$, TiS$_2$, MoS$_2$, NiPS$_3$, TiSe$_3$, TiTe$_2$, MoS$_2$, MoSe$_2$, InSe; coke, graphite, aluminum, CF$_n$, (C$_2$F)$_n$, C$_7$CoCl$_2$, poly(acetylene), poly(pyrrole), poly(vinylferrocene), poly(aniline), poly(p-phenylene), poly(phenylene sulfide) and combinations thereof.

8. The battery of claim 3, wherein the first electrode is lithium and the second electrode is carbon or aluminum.

9. The battery of claim 3, wherein the first electrode is MnO$_2$ and the second electrode is aluminum.

10. The battery of claim 3, wherein the first electrode is lithium, the second electrode is aluminum or carbon, and the coating is a salt.

11. The battery of claim 3, wherein the first electrode is MnO$_2$, and the second electrode is aluminum.

12. The battery of claim 3, wherein the pore coating consists of one or more salts, and further wherein the coating has a thickness between about 1 nm and 20 nm.

13. The battery of claim 3, wherein the pore coating consists of one or more anions or cations.

14. The battery of claim 3, wherein the pore coating is imparted by melting a salt onto the inner walls of the pores, wherein the salt is selected from the group consisting of: lithium iodide, lithium bromide, lithium chloride, lithium fluoride, and combinations thereof.

15. The battery of claim 3, wherein the pore coating is imparted by: washing the base membrane with an aqueous or organic solution, the solution containing a solvent and at least one ionic species; and evaporating the solvent.

16. The battery of claim 3, wherein the pore coating is imparted by: washing the base membrane with an organic solution, the solution containing a solvent and at least one ionic species; and evaporating the solvent, and wherein the organic solution contains at least one compound selected from the group consisting of: propylene carbonate, ethylene carbonate, gamma.butyrolactone, 1,3-dioxolane, dimethoxyethane, dimethyl carbonate, methylethyl carbonate, diethyl carbonate, tetrahydrofuran, dimethyl sulfoxide, polyethylene glycol dimethyl ether, methanol, formamide, propylene carbonate, ethylene carbonate, .gamma.-butyrolactone, 1,3dioxolane, dimethoxyethane, dimethyl carbonate, methylethyl carbonate, diethyl carbonate, tetrahydrofuran, dimethyl sulfoxide, polyethylene glycol dimethyl ether and combinations thereof.

17. The battery of claim 3, wherein the pore coating is imparted by: washing the base membrane with an aqueous solution, the solution containing a solvent and at least one ionic species; and evaporating the solvent, and wherein the aqueous solution is selected from the group consisting of: sodium hydroxide, potassium hydroxide, ammonium hydroxide, lithium hydroxide, cesium hydroxide aluminum chloride, aluminum chloride hexahydrate, sodium chloride, potassium chloride, cesium chloride, aluminum nitrate, aluminum sulphate, aluminum chromate, ammonium chromate, sodium chromate, potassium chromate, ZnCl, $AlCl_3$, $AlCl_3.6H_2O$, $Al(NO_3)_3$, HCl, $NH_4OH$, $H_2SO_4$, NaOH, KOH, LiOH, CsOH, NaCl, KCl, CsCl, $Al_2(SO_4)_3$ and combinations thereof.

18. The battery of claim 3, wherein the pore coating is a metal oxide and wherein the metal oxide is deposited by a process selected from the group consisting of: atomic layer deposition (ALD), chemical vapor deposition (CVD), chemical reaction with a gas, chemical reaction with a solution reagent, and combinations thereof.

19. The battery of claim 10, wherein the pore coating has a thickness of less than about $\frac{1}{10}^{th}$ the pore diameter of the base membrane.

20. A specialized battery comprising:
a first electrode;
a second electrode;
a physicochemically active membrane (PAM) separator/electrolyte, the PAM having a first and second face, the PAM having a plurality of pores running the PAM between the first and second faces, and wherein PAM is constructed of (a) specialized materials selected from the group of ion conducting materials consisting of: metal oxides, specialized plastics, silicate glasses, and combinations thereof and wherein the pores have an inner wall;
wherein, the inner pore walls of the PAM have a defined coating, and wherein the defined pore coating is selected from the group consisting of: salts, anions, cations, and combinations thereof, wherein the defined pore coating has a thickness of less than about half the pore diameter of the base membrane, and further wherein the pores are not otherwise filled;
wherein the first electrode completely covers, and is in ionic communication with, all the pores of the first face of the PAM, wherein the second electrode completely covers, and is in ionic communication with, all the pores of the second face of the membrane, and wherein the PAM pores have diameters ranging from about 2 nm to about 150 nm.

21. The battery of claim 20, wherein the electrodes are impermeable to gas, and further wherein the electrodes are attached to the faces of the PAM creating a closed battery impermeable to gas.

22. The battery of claim 20, wherein the first and second faces of the PAM have a polymer laminate coating that does not enter the membrane pores, and further wherein the laminate coating has a thickness between about 1 nm and 10 μm.

* * * * *